(12) United States Patent
Haynie et al.

(10) Patent No.: US 6,921,249 B1
(45) Date of Patent: Jul. 26, 2005

(54) MAIN ROTOR SHEAR RESTRAINT

(75) Inventors: David Allen Haynie, Euless, TX (US); James Lee Braswell, Colleyville, TX (US); Ernst C. Schellhase, Fort Worth, TX (US); Joseph J. Zierer, Fort Worth, TX (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/456,142

(22) Filed: Jun. 5, 2003

(51) Int. Cl.[7] ............................................. F63H 1/06
(52) U.S. Cl. .............................. 416/134 R; 416/134 A
(58) Field of Search ........................ 416/134 R, 134 A

(56) References Cited

U.S. PATENT DOCUMENTS

| | | | |
|---|---|---|---|
| 3,559,927 A | * | 2/1971 | Baekken ..................... 244/115 |
| 3,782,854 A | * | 1/1974 | Rybicki ................... 416/134 R |
| 4,135,856 A | * | 1/1979 | McGuire ................. 416/134 A |
| 4,427,340 A | * | 1/1984 | Metzger et al. ............. 416/141 |
| 4,652,210 A | * | 3/1987 | Leman et al. ............... 416/140 |
| 5,113,713 A | | 5/1992 | Isabelle et al. |
| 5,215,502 A | * | 6/1993 | Neathery et al. ............. 464/71 |
| 6,127,762 A | | 10/2000 | Pedlar |

OTHER PUBLICATIONS

Donald Kunz, Influence of Elastomeric Lag Damper Modeling, AIAA Paper No. 97-1179, Apr. 1997.
N.M. Wereley, G.M. Kamath,Model Scale Comanche Helicopter Lag ModeDamper, Int.J.Eng vol. 13, #5 1997.

* cited by examiner

Primary Examiner—Hoang Nguyen
(74) Attorney, Agent, or Firm—Mark O. Glut; John Gladstone Mills, III; NAVAIR, Naval Air Systems Command

(57) ABSTRACT

A main rotor shear restraint that includes two spherical ball segments, two corresponding bearing outer races, and a spring system for loading the bearing outer races against the two spherical ball segments.

15 Claims, 2 Drawing Sheets

MAIN ROTOR SHEAR RESTRAINT

STATEMENT OF GOVERNMENT INTEREST

The invention described herein may be manufactured and used by or for the Government of the United States of America for governmental purposes without payment of any royalties thereon or therefor. This invention was invented under contract number N00019-96-C-0128 with Bell Helicopter Textron, Inc.

BACKGROUND

The present invention relates to a shear restraint on a main rotor. More specifically, but without limitation, the present invention relates to a helicopter flex beam main rotor shear restraint.

A main rotor on a helicopter is the main system of rotating airfoils of a helicopter. The main rotor is considered to be an important part of the helicopter. It provides the lift that allows the helicopter to fly, as well as the control that allows the helicopter to move laterally, make turns and change altitude. The main rotor of a helicopter must be able to adjust the angle of the rotor blades in order to perform these various maneuvers.

The main rotor typically has a yoke, which can be defined, but without limitation, as a flexure that retains the helicopter blades of the main rotor. The rotating controls adjust the angle of the rotor blades with each revolution of the rotor. Bearings within the main rotor system allow for movement of the main rotor components while reacting the loads. Certain bearings, such as the shear restraint bearing, accommodate the blade feathering (blade feathering can be defined, but without limitation, as the action of changing a blade angle of a controllable pitch propeller) and flapping motions, and react the blade loads.

In a typical helicopter, main rotor self-lubricated shear restraint bearings become loose due to bearing wear. This can create a play in the bearings and reduce the effectiveness of the lead-lag damper. A lead-lag damper is needed in flex beam rotors in order to provide the necessary lead-lag damping to the rotor system. A system is needed to prevent these bearings from becoming loose due to bearing wear.

Furthermore, standard yokes typically require a hole in the yoke. Having a hole makes the design of the yoke more complicated, as well as potentially creating weak spots in the yoke. A system is needed that eliminates the need for a hole in the yoke.

Thus, there is a need in the art to provide a main rotor shear restraint that incorporates the listed benefits without the limitations inherent in present methods. For the foregoing reasons, there is a need for a main rotor shear restraint.

SUMMARY

The instant invention is directed to a main rotor shear restraint that satisfies the needs enumerated above and below.

The present invention is directed to a main rotor shear restraint that includes two spherical ball segments, two corresponding bearing outer races, and a spring system for loading the bearing outer races against the two spherical ball segments.

It is an object of the invention to provide a main rotor shear restraint that prevents bearings from becoming loose due to bearing wear.

It is an object of the invention to provide a main rotor shear restraint that accommodates dynamic feathering motions, hub misalignments, and steady and dynamic loads.

It is an object of the invention to provide a main rotor shear restraint that allows a yoke without a hole to be used in a helicopter.

DRAWINGS

These and other features, aspects and advantages of the present invention will become better understood with reference to the following description and appended claims, and accompanying drawings wherein:

DESCRIPTION

Figure 1:
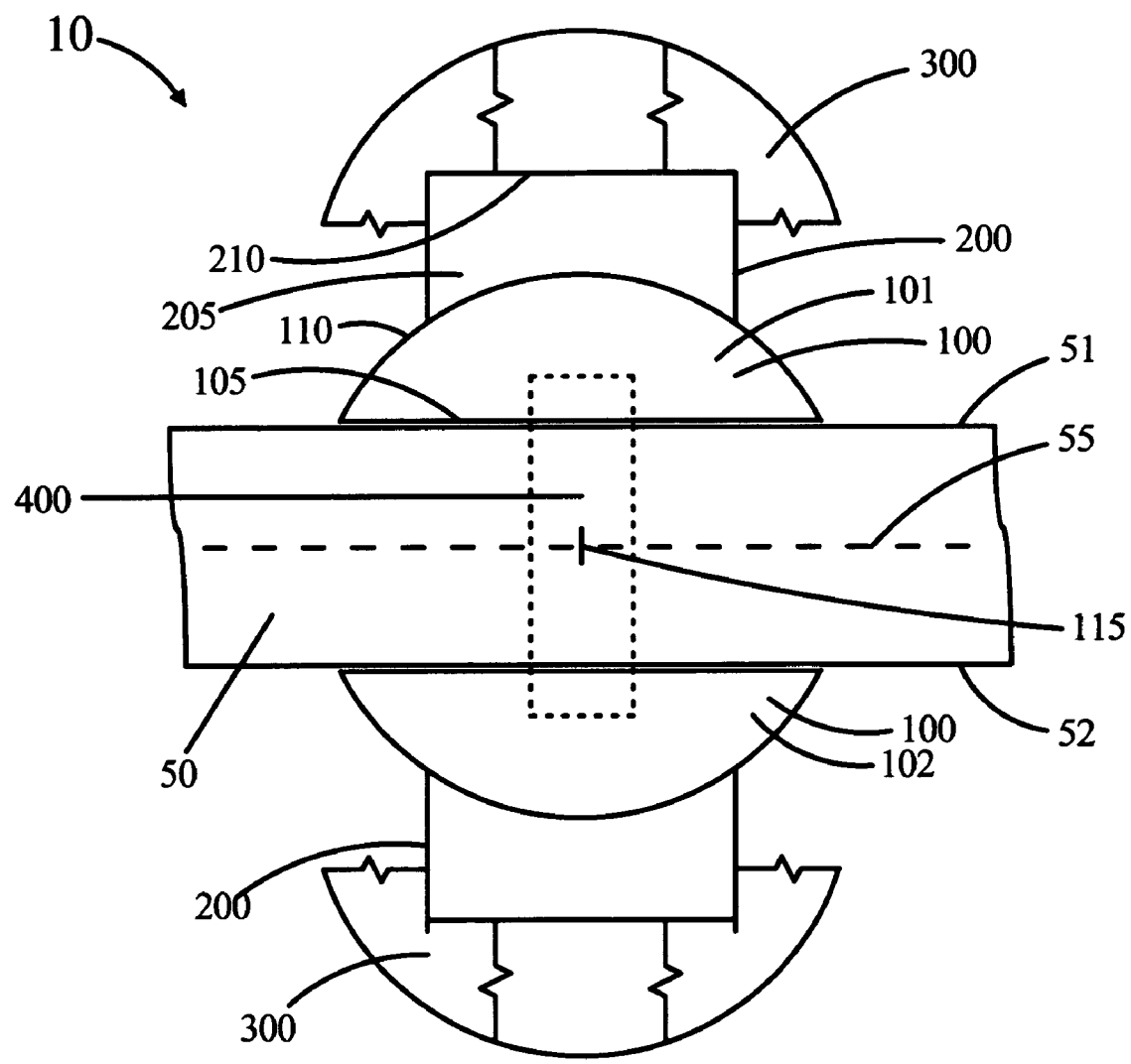
FIG. 1 is a cross sectional view of an embodiment of the main rotor shear restraint in use.
Figure 2:
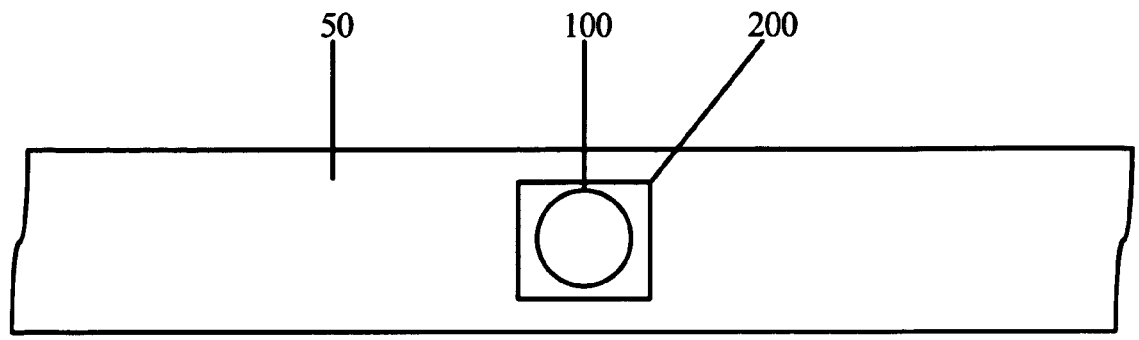
FIG. 2 is a top cut off view of the spherical segment and bearing outer race.
Figure 3:
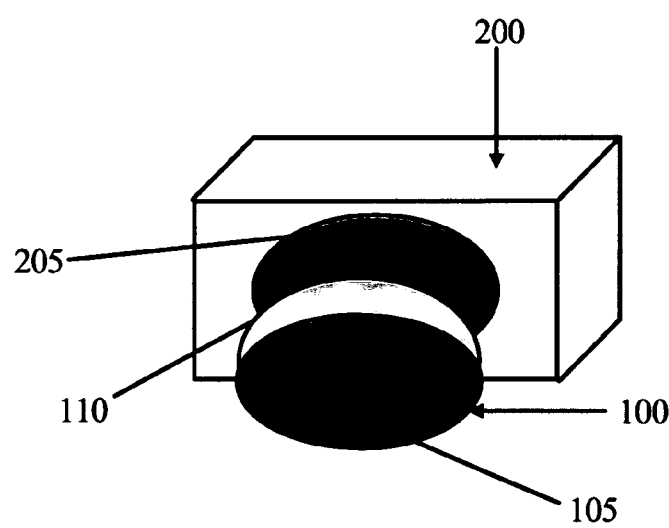
FIG. 3 is a bottom exploded perspective view of a corresponding spherical segment and outer race.

The preferred embodiments of the present invention are illustrated by way of example below and in FIGS. 1, 2 and 3. As seen in FIG. 1, the main rotor shear restraint 10 for a helicopter includes two (2) spherical or hemispherical segments 100, two (2) bearing outer races 200, and a spring system 300. Typically a helicopter includes a yoke 50 that communicates with the helicopter rotors. The yoke 50 may be a flex beam type yoke; however, the present invention can be used with any type of yoke 50. The yoke 50 may have two sides, a first yoke side 51 and a second yoke side 52. Each spherical or separate solid hemispherical segment 100 is fixed to a side of the yoke and has a corresponding bearing outer race 200. For instance, as seen in FIG. 1, a first spherical segment 101 may be fixed to the first yoke side 51, while a second spherical segment 102 may be fixed to the second yoke side 52. The spring system 300 is for loading each bearing outer race 200 against its corresponding spherical segment 100.

In the discussion of the present invention, the invention will be discussed in a helicopter environment; however, this invention can be utilized for other vehicles or machinery that utilize a main rotor.

In the preferred embodiment, the spherical segment 100 can be a segment of a ball. The type of spherical or ball segment that can be used in this invention is, but without limitation, a hardened ball segment that can run in spherical seats called races. As seen in FIGS. 1 and 3, the spherical segment 100 may include a flattened portion 105 and a spherical portion 110. The flattened portion 105 is substantially level and even, and has no marked projections or depressions. Accordingly, the flattened portion 105 has an appearance similar to a typical tabletop. The spherical portion 110 is substantially rounded and circular or shaped like a segment of a solid geometric figure generated by the revolution of a semicircle about its diameter. Accordingly, the spherical portion 110 has an appearance similar to a dome or a spherical vault. In the preferred embodiment, the flattened portion 105 is apositioned or disposed on a side of the yoke 50, while the spherical portion 110 is apositioned to the bearing outer race 200. As seen in FIG. 1, in the preferred embodiment, both spherical centers 115 of each of the two spherical segments 100 are coincident with the center of the yoke 55, specifically the vertical center of the yoke. Furthermore, both spherical centers 115 may be coincident with each other.

The bearing outer race 200 can be defined, but without limitation, as a spherical seat for the spherical segment 100. The bearing outer race 200 may have a seat portion 205 and a spring communicating portion 210. As seen in FIG. 3, the seat portion 205 of the bearing outer race 200 is shaped to correspond to the spherical portion 110 of the spherical segment 100. The spring communicating portion 210 communicates with the spring system 300 to allow the spring system to apply pressure on the bearing outer race 200. The spring communicating portion 210 may be substantially flat, substantially concave or convex, or any shape that lends itself to effectively communicating with the spring system 300.

In the preferred embodiment the bearing outer race 200 is coated with polytetrafluoroethylene or Teflon®, specifically the seat portion 205. The spherical segment 100 may be a segment of a feathering ball bearing and may also be coated with polytetrafluoroethylene or Teflon®.

In other variations of the invention there may be more than two spherical segments 100 and corresponding bearing outer races 200 within the main rotor shear restraint 10. The spherical segments 100 may be manufactured from steel, metal, metal alloy, or any type of material that lends itself to a bearing or spherical shape.

The spring system 300 applies pressure to the bearing outer races 200 to prevent looseness in the spherical segments 100. Even as the spherical segments 100 or bearing outer races 200 wear, pressure from the spring system continues to minimize looseness. The spring system 300 may be two separate systems, one for each set of spherical segment 100 and bearing outer race 200 or one system that applies pressure to all the spherical segment-bearing outer race sets in the invention. The spring system 300 may be a mechanical spring system or an elastomeric spring system.

In one of the embodiments of the main rotor shear restraint 10, specifically a main rotor shear restraint 10 on a H-I helicopter, the spring system 300 with about 110,000 pounds per inch of stiffness will retain the bearing outer race 200.

The spherical segments 100 may be attached to both sides of the yoke 50 by any attachment method. Each spherical segment 100 may be independently rigidly attached or fixed to the yoke 50. The spherical segment 100 may be attached to the yoke 50 by any means practicable. For instance the following attachment methods or means may be used: adhesive, chemical agents, magnets, screws, bolts, nails, hooks, or any other type of attacher or attachment method or means that lends itself to attaching the spherical segment 100 to the yoke 50. In the preferred embodiment, the spherical segment 100 is attached to the yoke 50 by a shear pin 400 (shown by dashed lines in FIG. 1). A single shear pin 400 may attach both spherical segments 100 to the yoke 50, or each spherical segment 100 may have its own corresponding shear pin 400.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred versions thereof, other versions are possible. Therefore, the spirit and scope of the appended claims should not be limited to the description of the preferred versions contained herein.

What is claimed is:

1. A main rotor shear restraint, the main rotor having a yoke with at least two sides, said yoke is a flexure that directly retains the helicopter blades of the main rotor, the main rotor shear restraint comprising:

(a) two separate solid hemispherical segments, each hemispherical segment fixed directly to opposite sides of the yoke;
    (b) two bearing outer races, each bearing outer race corresponding to one of the hemispherical segments; and
    (c) a spring system for loading the bearing outer races against the hemispherical segments.

2. The main rotor shear restraint of claim 1, wherein each hemispherical segment has a flattened portion and a spherical portion, the flattened portion apositioned to the yoke, and the spherical portion apositioned to the corresponding bearing outer race.

3. The main rotor shear restraint of claim 2, wherein the two bearing outer races are coated with polytetrafluoroethylene.

4. The main rotor shear restraint of claim 3, wherein the two hemispherical segments are coated with polytetrafluoroethylene.

5. The main rotor shear restraint of claim 4, wherein the main rotor restraint further comprising a shear pin, the shear pin attaching the hemispherical segments to the yoke.

6. A helicopter main rotor shear restraint, the helicopter main rotor having a yoke with at least two sides, said yoke is a flexure that directly retains the helicopter blades of the main rotor, the helicopter main rotor shear restraint comprising:

(a) two separate solid hemispherical segments, each hemispherical segment having a flattened portion and a spherical portion, the flattened portion apositioned to a side of the yoke;
    (b) two bearing outer races, each bearing outer race corresponding to one of the hemispherical segments, each bearing race having a seat portion and a spring communicating portion, the seat portion apositioned to the spherical portion of the corresponding hemispherical segment; and
    (c) a spring system for loading the bearing outer races against the hemispherical segments, the spring communicating portion of the bearing outer race communicating with the spring system such that the spring system can apply pressure on the bearing outer races which can then apply pressure on the hemispherical segments.

7. The helicopter main rotor restraint of claim 6, wherein the two bearing outer races are coated with polytetafluoroethylene.

8. The helicopter main rotor restraint of claim 7, wherein the two hemispherical segments are coated with polytetrafluoroethylene.

9. The helicopter main rotor shear restraint of claim 8, wherein the helicopter main rotor restraint further comprising a shear pin, each hemispherical segment attached to the yoke via the shear pin.

10. The helicopter main rotor restraint of claim 8, wherein the helicopter main rotor restraint further comprising two shear pins, each shear pin attaching one of the hemispherical segments to the yoke.

11. The helicopter main rotor shear restraint of claim 8, wherein the spring system is a mechanical spring system.

12. The helicopter main rotor shear restraint of claim 8, wherein the spring system is an elastomeric spring system.

13. The helicopter main rotor shear restraint of claim 12, wherein each hemispherical segment having a spherical center, the yoke having a center, each spherical center of the two hemispherical segments is coincident with the center of the yoke.

14. The helicopter main rotor shear restraint of claim 13, wherein both spherical centers are coincident with each other.

15. A helicopter flex beam main rotor shear restraint, the helicopter main rotor having a yoke with at least two sides, said yoke is a flexure that directly retains the helicopter blades of the main rotor, the helicopter main rotor shear restraint comprising:

(a) two separate solid hemispherical segments, each hemispherical segment having a flattened portion and a spherical portion, the flattened portion apositioned to a side of the yoke, each hemispherical segment having a spherical center, the yoke having a yoke center, each spherical center of the two hemispherical segments is coincident with the center of the yoke and both spherical centers are coincident with each other, the two hemispherical segments are coated with polytetrafluoroethylene;

(b) two bearing outer races, each bearing outer race corresponding to one of the hemispherical segments, each bearing race having a seat portion and a spring communicating portion, the seat portion apositioned to the spherical potion of the corresponding hemispherical segment, the two bearing outer races are coated with polytetrafluoroethylene;

(c) an elastomeric spring system for loading the bearing outer races against the hemispherical segments, the spring communicating portion of the bearing outer race communicating with the spring system such that the spring system can apply pressure on the bearing outer races which can then apply pressure on the hemispherical segments; and (d) a shear pin, the shear pin attaching the hemispherical segments to the yoke.

* * * * *

UNITED STATES PATENT AND TRADEMARK OFFICE
CERTIFICATE OF CORRECTION

PATENT NO. : 6,921,249 B1
DATED : July 26, 2005
INVENTOR(S) : Haynie et al.

It is certified that error appears in the above-identified patent and that said Letters Patent is hereby corrected as shown below:

Column 3,
Line 38, should read:
-- H-1 helicopter, the spring system 300 with about 110,000 --.

Column 4,
Line 52, should read:
-- the two bearing outer races are coated with polytetrafluoro- --.

Column 6,
Line 8, should read:
-- the spherical portion of the corresponding hemispherical --.

Signed and Sealed this

Fourth Day of October, 2005

JON W. DUDAS
*Director of the United States Patent and Trademark Office*